(No Model.) 2 Sheets—Sheet 1.

C. JORGENSEN.
WATER BICYCLE.

No. 412,391. Patented Oct. 8, 1889.

Witnesses

Inventor
Charles Jorgensen.
By Paul Sanford & Mewen Attys.

(No Model.) 2 Sheets—Sheet 2.

C. JORGENSEN.
WATER BICYCLE.

No. 412,391. Patented Oct. 8, 1889.

Witnesses

Inventor
Charles Jorgensen

UNITED STATES PATENT OFFICE.

CHARLES JORGENSEN, OF ST. PAUL, MINNESOTA.

WATER-BICYCLE.

SPECIFICATION forming part of Letters Patent No. 412,391, dated October 8, 1889.

Application filed May 10, 1888. Serial No. 273,468. (No model.)

*To all whom it may concern:*

Be it known that I, CHARLES JORGENSEN, of St. Paul, Ramsey county, Minnesota, have invented new and useful Improvements in Water-Bicycles, of which the following is a specification.

My invention relates to improvements in boats, sometimes styled "catamarans," constructed of two independent hulls rigidly joined together parallel to each other and propelled by side paddle-wheels; and it consists in various improved methods in construction and operating the same, as fully set forth in the following specification and claims.

Figure 1:
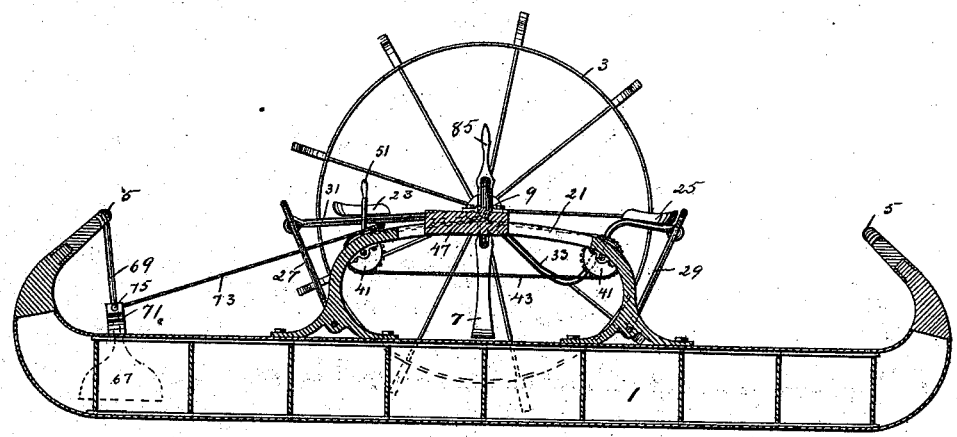
Figure 2:
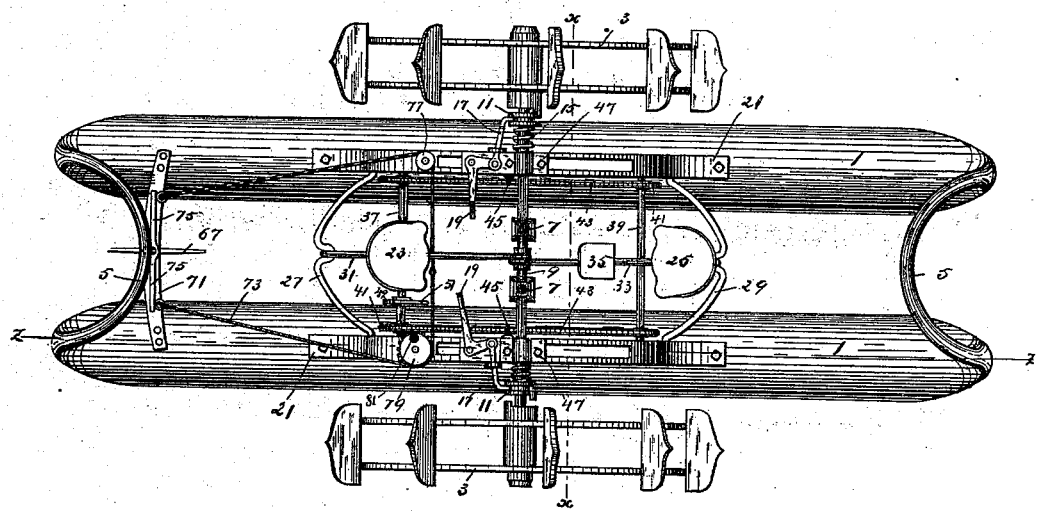
Figure 3:
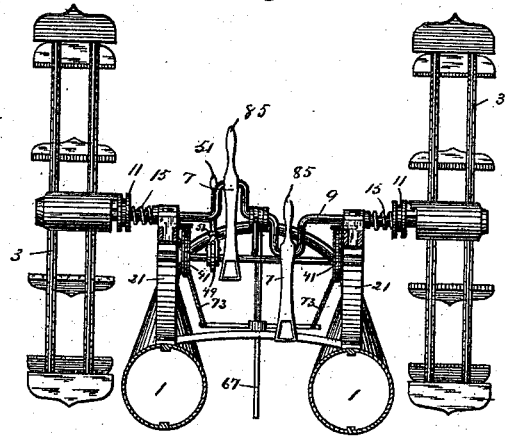
Figure 4:
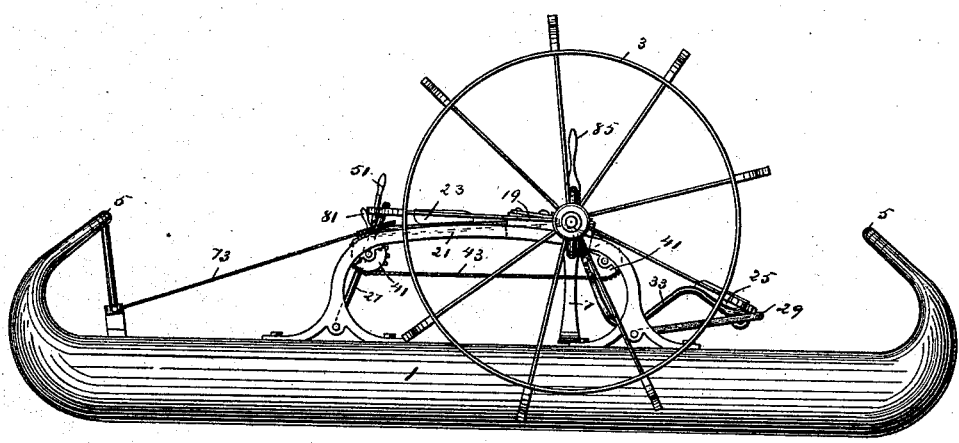
Figure 5:
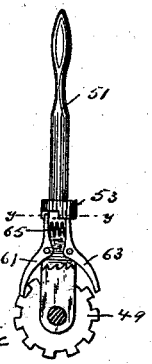
Figure 6:
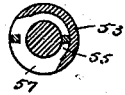

In the drawings forming part of this specification, Figure 1 is a vertical longitudinal section through one of the hulls in the line Z Z in Fig. 2, showing the construction of the hull. Fig. 2 is a plane view of bicycle. Fig. 3 is a cross-section of same through the line X X, Fig. 2. Fig. 4 is a side elevation of same. Figs. 5 and 6 are detail drawings of lever for operating tiller rope or chain.

In the drawings, 1 1 are the hulls of boat. They are constructed, preferably, of cylindrical form and comprising water-tight compartments, as shown in Fig. 1, and rigidly connected to each other at each end by 5, which is preferably made of metal pipe, their relative position being parallel and separated sufficiently for the convenient operation of the treadles 7. The paddle-wheels 3 are fitted upon the crank-shaft 9 by suitable gearing adapted when "in gear" to turn with the shaft or when thrown "out of gear" to allow the shaft to revolve freely in them, each being thrown in or out of gear independently of the other. I prefer to use for this purpose, as shown in the drawings, a grooved collar 11, sliding longitudinally upon the shaft, but turning with it. A spiral spring 15 holds the collar pressed against the hub of the paddle-wheel, so that the cogs in each intermesh and carry the wheel around with the shaft. The collar is thrown out of gear with the paddle-wheel by the bell-crank lever 19, operating the arm 17, the hooked end of which rides in the groove of the collar 11, and thus pulls it away from the paddle-wheel. When the lever is released, the spring 15 throws the collar back into gear again. The crank-shaft 9 is supported in proper bearings upon the arch or frame 21, which is fastened to the upper side of the hull or ponton, the bearing being adapted to slide in the supporting-frame longitudinally with the boat, so as to carry the paddle-wheels toward the bow or stern, as desired. The seats 23 and 25 are supported upon frames, preferably of metal tubing, and adjusted so as to adapt the bicycle to carrying one or two persons. The seat 23 is used in both cases, 25 being an extra seat for the second person.

As shown in Figs. 1 and 2, the seats are adjusted for the carrying of two persons, while in Fig. 4 the extra seat is turned down, the paddle-wheels moved forward, and the bicycle arranged for carrying one person only. The ends of the arched or bail-shaped supports 27 and 29 for the seats turn in the supporting-frames 21 and are connected by 31 and 33, respectively, to the crank-shaft 9 at its center, which connections are fitted at each end with eyes or loops to allow the supports 27 and 29 and the shaft 9, respectively, to turn freely in them. The connecting-piece 33 is bent downward and carries a stirrup or support 35 for the feet of the person occupying the seat 25, as shown in Fig. 1. 37 and 39 are shafts turning in bearings in the frames 21, and fitted, preferably, with sprocket-wheels 41, which carry the endless chains 43. These chains are fastened rigidly at 45 to the bearing-boxes 47 of the crank-shaft 9. Upon the shaft 37 is fastened the cog-wheel 49, fitted with the dogged lever 51. (See Fig. 5.) The lever-handle is fitted with the collar 53, (see Fig. 6,) which has a concentric groove 55 in its lower face, a part of the outer wall of the groove being cut away, 57. This collar is adapted to hold in its groove the upper end or arm of one of the dogs 61 and 63, so as to throw the lower end of the dog out of the cogs of the wheel 49, while the arm of the opposite dog, being in the cut-away space of the collar, is pressed outward by the spring 65, and the lower end thus engages with the cogs of the wheel 49. By giving the collar 53 a half-turn the first dog is released and the other held in the groove and the relative positions of the dogs reversed. By throwing the lever 51 toward the stern of the bicycle, the dog 61 being free and engaging with the cogs of the wheel 49, the shaft 37 is turned in the same direction, carrying on its sprockets the chains 43, which carry along the shaft 9 and its attachments. By reversing the collar 53 the lever can be thrown forward and the operation reversed. The rudder 67 is supported on the shaft 69, which turns in bearings in cross-bar 71 and the arch 5. The rudder is operated, preferably, by a chain 73, attached to the arms 75 of the rudder; thence passing around the sheave 77 and the sheave or sprocket-wheel 79, which is turned by the handle 81 by the person occupying the seat 23, and the course of the bicycle directed. The treadles 7 are suspended on the cranks of the shaft 9 and have a stirrup for the foot of the operator, who sits in seat 23, while the tops of the treadles are handles 85, which the person in the seat 25 can grasp and direct in propelling the bicycle, and which a single operator can use as an assistance in propelling the bicycle alone.

The mode of operation is as follows: For two occupants the bicycle is adjusted as in Figs. 1 and 2, the seats being adjusted on their supports 31 and 33 at the proper distance from the shaft 9 to suit the size of their occupants. The person in seat 23 uses the stirrups of the treadles, while the one in 25 assists him by grasping the handles of the treadles. The one in 23 guides the bicycle by means of the tiller-chain and sprocket-wheel. When it is necessary to turn the bicycle around by means of one of the levers 19, he throws one of the paddle-wheels out of gear, while the other continues to be turned, thus readily making a sharp turn of the bicycle. To adjust the bicycle for a single person, the lever 51 being adjusted with the dog 63, engaging with the cog-wheel 49, it is worked forward and back, and thus by means of the chains 43 the paddle-wheel shaft and attachments are carried forward to any desired position. The seat 25 being depressed out of the way, as shown in Fig. 4, the bicycle is then operated, as described, the operator working the treadles with his feet in the stirrups and grasping the handles with his hands and guiding the bicycle, as described, either forward or backward.

I claim as my invention—

1. In a boat or water-bicycle having two independent hulls properly joined together, the combination, with a crank-shaft carrying and driving side paddle-wheels, of adjustable bearings for said shaft adapted to slide in or upon their supports longitudinally with the boat and to carry the paddle-wheels of the boat forward or aft, as desired, substantially as described.

2. In a boat or water-bicycle having two independent hulls properly joined together, the combination, with a crank-shaft carrying and driving side paddle-wheels, of the adjustable bearings 47, adapted to slide in or upon their supports longitudinally with the boat and to carry the paddle-wheels forward or aft, as desired, and the seats 23 and 25, supported upon the connecting rods or bars 31 and 33, joined, respectively, at one end to the crank-shaft and at the other end to the bail-shaped supports 27 and 29, so that the seats are moved forward and backward with the paddle-wheels and shaft, substantially as described.

3. In a water-bicycle or side-wheel boat, the combination, with the shaft 9, supporting and driving the paddle-wheels 3, and having adjustable sliding bearings 47, of the sprocket-chains 43, rigidly fastened to the bearing-boxes at 45, the sprocket-carrying shafts 37 and 39, and the lever 51, fixed to one of the shafts 37 and 39, by means of which the shaft is turned in either direction, so as to drive the sprocket-chains and shift the position of the paddle-wheel shaft, substantially as described.

CHARLES JORGENSEN.

Witnesses:
SOREN J. RICE,
ARTHUR P. LOTHROP.